United States Patent [19]

Viertel et al.

[11] Patent Number: 4,458,938
[45] Date of Patent: Jul. 10, 1984

[54] ATTACHMENT OF COVERING ON SUN VISOR FOR VEHICLES

[75] Inventors: Lothar Viertel; Michael Köbel, both of Saarlouis; Peter Kaiser, Wermelskirchen, all of Fed. Rep. of Germany

[73] Assignee: Gebr. Happich GmbH, Fed. Rep. of Germany

[21] Appl. No.: 302,758

[22] Filed: Sep. 16, 1981

[30] Foreign Application Priority Data

Feb. 18, 1981 [DE] Fed. Rep. of Germany ....... 3105851

[51] Int. Cl.³ .............................................. B60J 3/00
[52] U.S. Cl. ...................................... 296/97 H; 5/403
[58] Field of Search ........................... 296/97 H, 97 R; 297/DIG. 1, 455; 5/402-410; 160/351

[56] References Cited

U.S. PATENT DOCUMENTS

| | | | |
|---|---|---|---|
| 3,751,106 | 8/1973 | Mahler et al. | 297/97 H |
| 3,827,748 | 8/1974 | Herr et al. | 297/97 H |
| 4,118,903 | 10/1978 | Coulthard | 160/351 |
| 4,155,127 | 5/1979 | Seiderman | 5/409 |
| 4,227,241 | 10/1980 | Marcus | 297/97 H |

FOREIGN PATENT DOCUMENTS

| | | |
|---|---|---|
| 1102219 | 4/1954 | France . |
| 1143365 | 3/1957 | France . |
| 2099564 | 3/1972 | France . |
| 2446738 | 1/1979 | France . |

*Primary Examiner*—Robert R. Song
*Attorney, Agent, or Firm*—Ostrolenk, Faber, Gerb & Soffen

[57] ABSTRACT

The disclosure concerns a sun visor for a vehicle and concerns various ways in which a piece of covering material is clamped in place over the exterior of the sun visor body. In all embodiments, the border of the piece of material is clamped in a groove in the sun visor body. The groove may be around the periphery. Alternatively, the visor body is comprised of two facing plates and the material is clamped between the plates. Pins on one plate may hold the material in place. Various clamping devices for clamping the border of the material between the plates are disclosed, including simply clamping the two plates together with the material between them, a mortise and tenon joint at the borders of the plates, a reinforcing strip between the plates which clamps the border of the material and the material having a drawstring around its hem for pulling the border tightly into the visor body.

27 Claims, 20 Drawing Figures

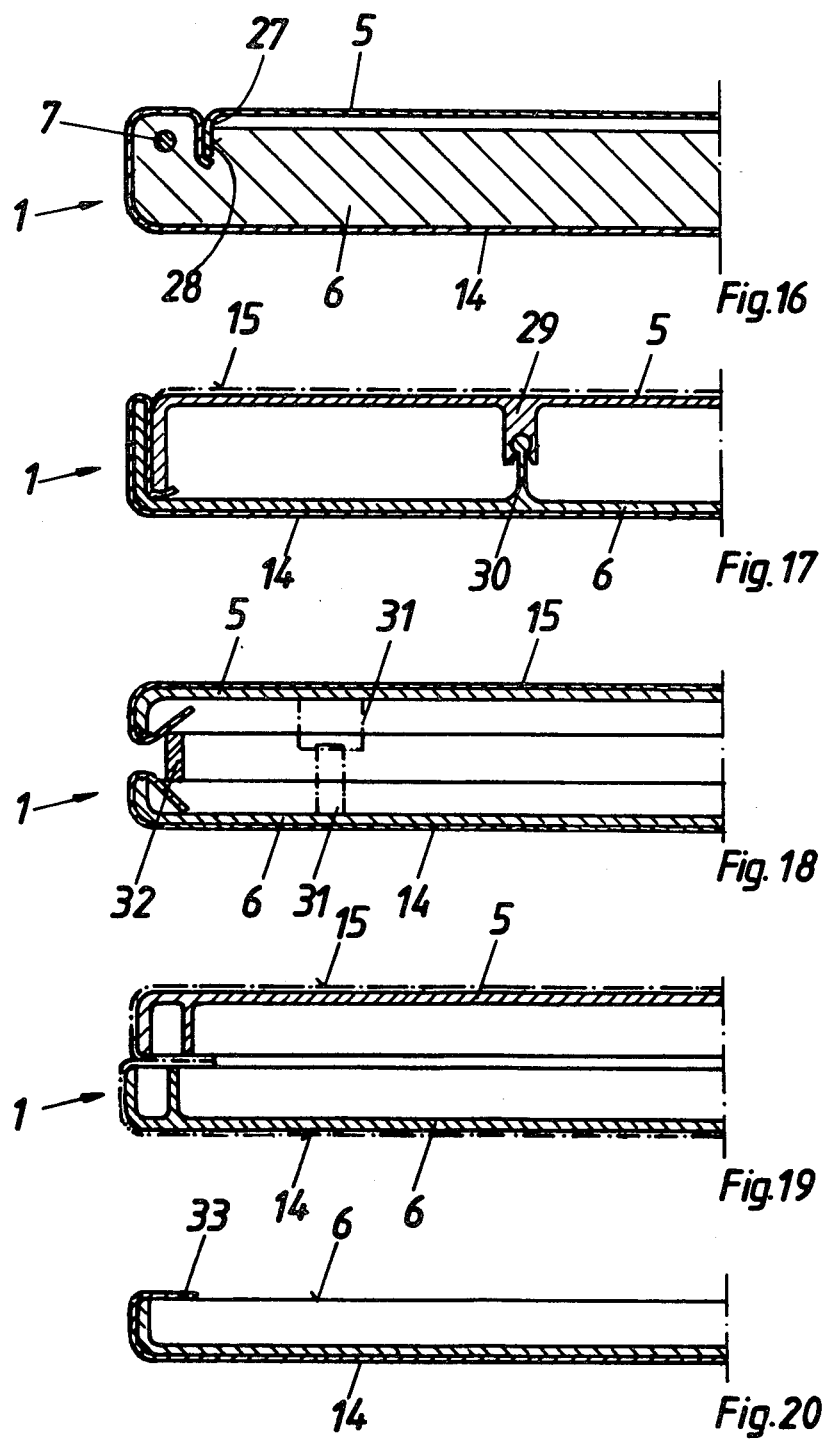

ATTACHMENT OF COVERING ON SUN VISOR FOR VEHICLES

BACKGROUND OF THE INVENTION

The invention concerns a sun visor covered with a flexible material, for use in motor vehicles.

A sun visor usually has a cover applied to the visor body to improve its appearance. If the cover is made of a thermoplastic material, specifically plastic foil, it can be applied fairly quickly and easily with a hot-bonding device. Often, however, it is desirable to cover the visor with a non-thermoplastic material like a textile, natural leather, etc. It is, however, quite expensive to cover known types of visors with pieces of non-thermoplastic material because they must be seamed with thread, cement, or both around the entire periphery of the visor. Particular problems arise when only one side of the visor is to be covered, because that side itself will be the only broad surface available to which the material may be cemented. Cementing an entire surface is labor intensive and expensive and the area where the boundary of the material follows the edge of the visor may not be smoothly finished.

SUMMARY OF THE INVENTION

The object of the invention is to simplify the construction of a sun visor of the type discussed above, especially with respect to covering it, and to make the visor cheaper to manufacture.

According to the invention, the visor body is provided with internal clamping means for securing the pieces of covering material over one or both side surfaces of the visor body. The clamping means facilitates fastening cover material, whether thermoplastic or not, to the visor simply by clamping the piece of material along its border without labor intensive hot-bonding, sewing, or cementing.

The region of the visor at which the border of the piece or pieces of material is actually clamped may extend along the midline of the entire periphery of the visor. This construction provides a practical means of covering one or both sides of the visor as desired, and the border of the piece or pieces of covering material will be hidden inside the visor, ensuring an attractively finished edge.

Alternatively, the material may be clamped along only one, preferably longitudinal, edge of the visor. Here the cover may be in the form of an appropriately sewn-seam pocket or pouch, in which the visor is inserted. The unseamed edges of the material, which form the open side of the pocket, is then inserted into the one edge of the visor body and is clamped.

The visor can now be covered simply and inexpensively on one or both sides as preferred with a thermoplastic material, with a non-thermoplastic material like woven or non-woven fabric, or even with leather. Clamping the border of the material eleminiates expensive hot bonding, sewing, or cementing and also ensures that the cover will lie perfectly smooth on the visor, even, surprisingly enough, when the visor body is partly concave.

Various embodiments of a sun visor including the above-described concepts are envisioned.

The sun visor body may be comprised of two plates which are arranged side-by-side and have adjacent opposing faces. The plates may be congruent. Alternatively, one plate may be smaller than the other. The groove in which the border of the material extends would be a groove defined at the junction between the two plates.

Various fastening means for holding the plates together are envisioned. For example, pins projecting from one plate side extend into aligned holes on the adjacent, facing plate side. Alternatively, a mortise and tenon arrangement around the border of the plates holds them together. A snap connection between the plates may be used. Other fastening means may be apparent to one skilled in the art.

The visor body, and the plates thereof where the visor is comprised of two plates, may be formed of foamed material or they may be rigid molded plates. The visor body, is stiffened by a reinforcing insert, if needed. The reinforcing insert may include an appropriate reinforcement strip at the groove into the visor body and may include bracing elements at the pins and holes in the plates where that technique is used for assembling the plates of the visor body.

For securing the covering material in the visor body groove and/or for decorative purposes, a finishing strip may be inserted into the groove. The supporting pin and peg for the visor body may be secured to the finishing strip.

One side of the visor body or one side of a plate thereof may be provided with a depression for holding a mirror within it. Appropriate securing means hold the mirror in the depression.

Other objects of the invention are now described with references to the accompanying drawings.

BRIEF DESCRIPTION OF THE DRAWINGS

FIGS. 16 through 19 are sections through various different visor embodiments comprised of two plates; and FIG. 20 is a partial view of a plate in one embodiment with the cover on.

DESCRIPTION OF THE PREFERRED EMBODIMENT

Figure 1:
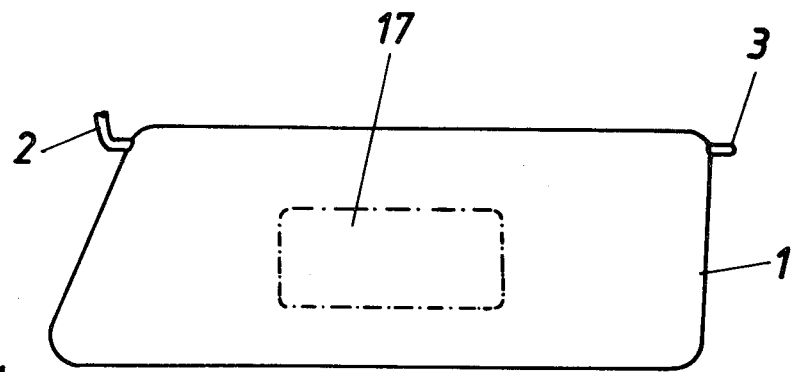
FIG. 1 is a side view of one embodiment of the visor.
Figure 2:
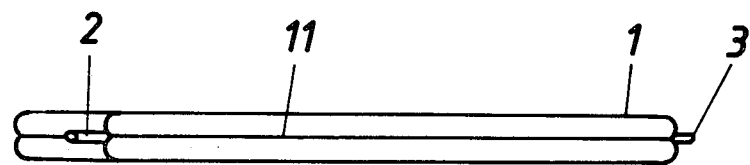
FIG. 2 is a top view of the embodiment in FIG. 1.
Figure 3:
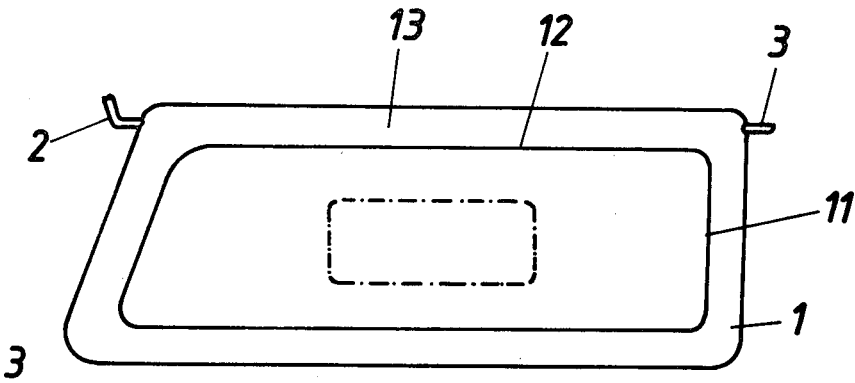
FIG. 3 is a side view of another embodiment of the visor.
Figure 4:
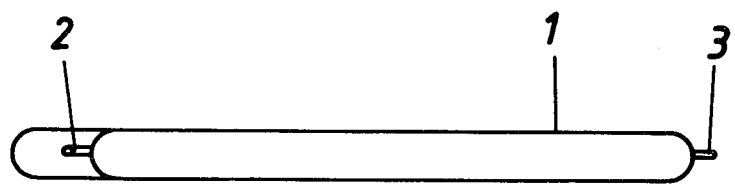
FIG. 4 is a top view of the embodiment in FIG. 3.
Figure 5:
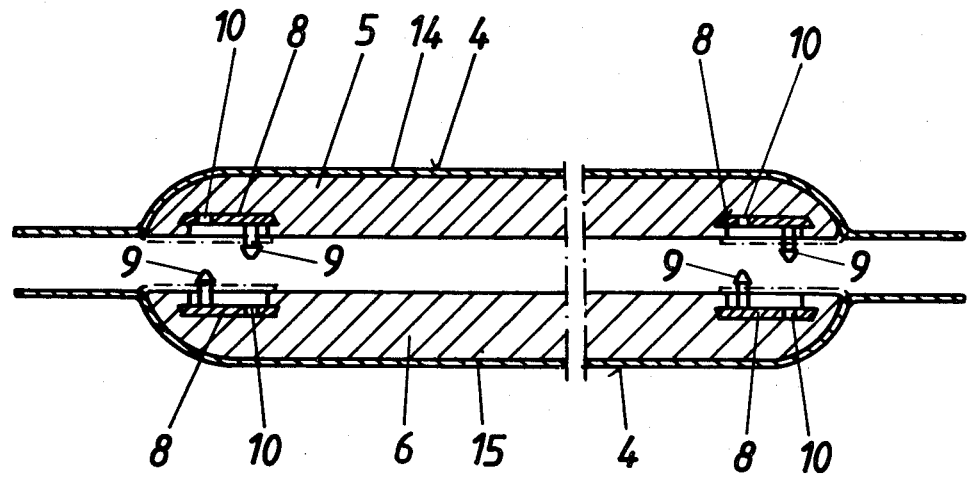
FIG. 5 is a section through the embodiment in FIGS. 1 and 2 before the separate plates of the visor body have been clamped together.
Figure 6:
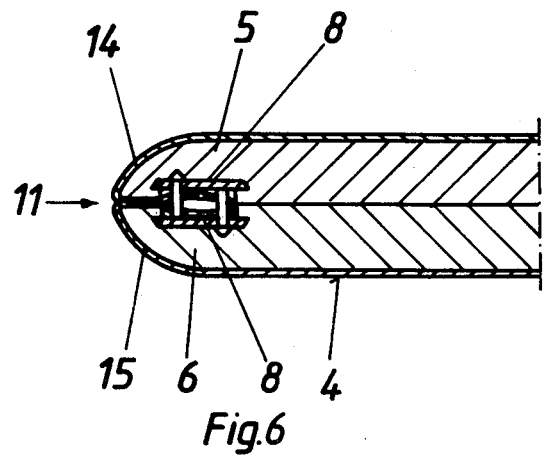
FIG. 6 is a partial section through the embodiment in FIG. 5 in the finished state.

All the illustrated embodiments of the sun visor include a visor body 1 with a support rod 2 at the top of the body 1. The rod 2 is mounted in a swivel mount, not illustrated, in the vehicle. The body has a securing peg 3 at the other end that fits into a securing mount, also not illustrated in the vehicle.

The visor body 1 in FIGS. 1, 2, 5 and 6 has a core that is completely surrounded by a cover 4. The body is comprised of two plates 5 and 6 that lie flat, facewise, congruently, one on top of the other, and that can be joined together (see FIG. 6 in particular). Plates 5 and 6 are preferably comprised of a plastic foam with good cushioning properties. The plates contain reinforcing, stiffening devices. One type of stiffening device comprises a wire frame 7 inserted into the foam core. An alternative or supplement to the frame 7 comprises one or more braces 8 inserted in each plate 5 and 6 of the core. Respective braces 8 are provided with pins 9 or holes 10 that are adapted to snap together. Each pin 9 has a head that is thicker than its shaft. Each pin is mounted exactly opposite an individual hole 10 in the other plate to enable the plates to be fastened together rapidly and easily. Fastening of plates 5 and 6 together leaves a joint 11 along the midline of the periphery of the visor body that will, however, not spoil its appearance.

In the embodiment shown in FIGS. 3 and 4 and 7 through 10, the plate 6, which is also made of plastic foam, has a recess 12 on one side that extends across the plate and is positioned on the plate to define a peripheral margin 13 around the recess. Plate 5 in this case is shorter and narrower than plate 6 and fits snugly into recess 12. This embodiment also has a joint 11 on the side of plate 6 to which plate 5 is applied. This joint will not spoil the appearance of the visor but will, on the contrary, be decorative.

The cover 4 in the embodiments shown in FIGS. 1 through 8 is comprised of two pieces 14 and 15 of plastic foil, woven or non-woven fabric, natural leather, or the like flexible and usually non-stretchable material. Each piece covers one of the plates 5 or 6. Each piece 14 or 15 is both wider and longer than its associated plate 5 or 6. The excess material on each piece forms a border that is laid over the edge of its plate 5 or 6, as shown, for instance, by the dot-dash line in FIGS. 5 and 7. Plates 5 and 6 are then fastened together at 9 and 10, leaving the borders on pieces 14 and 15 clamped between the plates at joint 11. It is practical to stretch the borders of the pieces over pins 9 to keep pieces 14 and 15 smoother and facilitate fastening plates 5 and 6 together.

Alternatively, before the plates 5 and 6 are formed, pieces 14 and 15 may be introduced into the mold in which plates 5 and 6 are to be formed, to establish a smooth and tight bond between the plates and the cover pieces and to save the labor of stretching the material tight later.

Obviously, pieces 14 and 15 can be of different colors, so that the invention applies equally to two-color visors. It is certainly also possible to cover only one plate 5 or 6 of the core.

Figure 9:
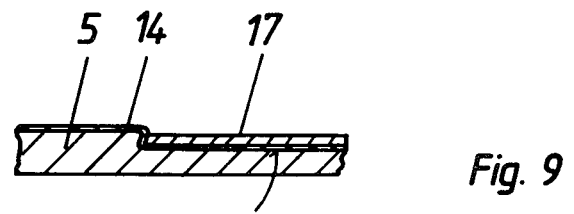
FIGS. 9 and 10 are sections of individual features of the invention.

FIG. 9 shows an area on plate 5 with an outwardly-facing depression 16, into which a mirror 17 fits against the surface of piece 14 of the cover material. The wall of the depression is undercut to hold the mirror in place.

Figure 10:
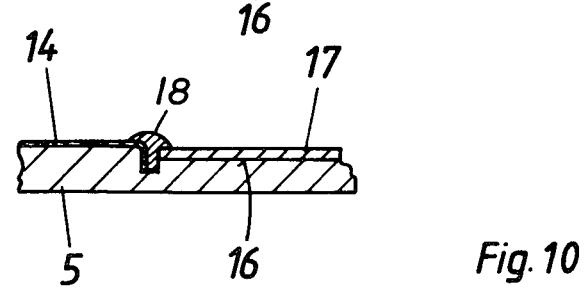

FIG. 10 also shows an outwardly-facing depression 16 in plate 5 into which a mirror 17 fits. In this case the mirror is held in place by an expansion strip 18 installed in the gap between the edge of the mirror and the wall of the depression.

Figure 11:
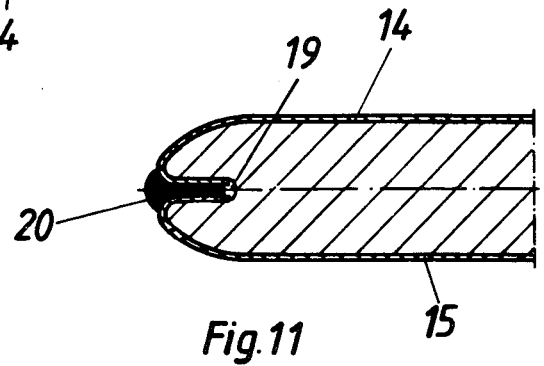
FIG. 11 is a section through a third embodiment of the invention.
Figure 7:
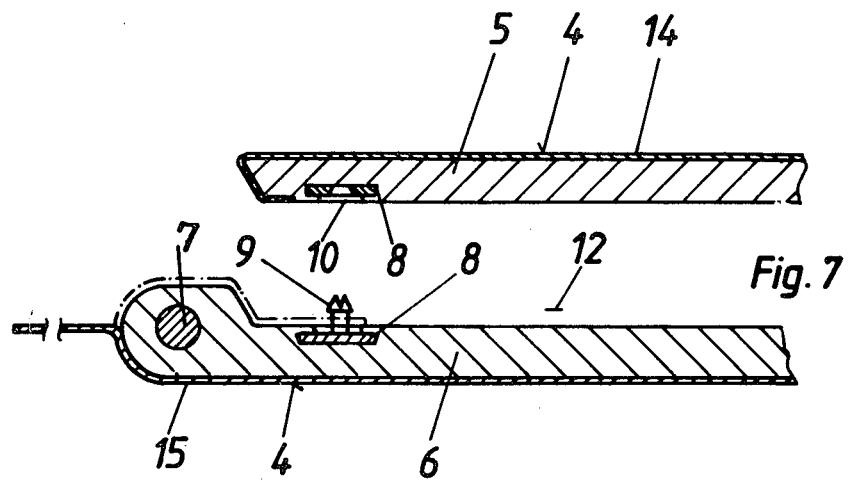
FIG. 7 is a section through the embodiment in FIGS. 3 and 4 before the separate plates of the visor body have been clamped together.
Figure 8:
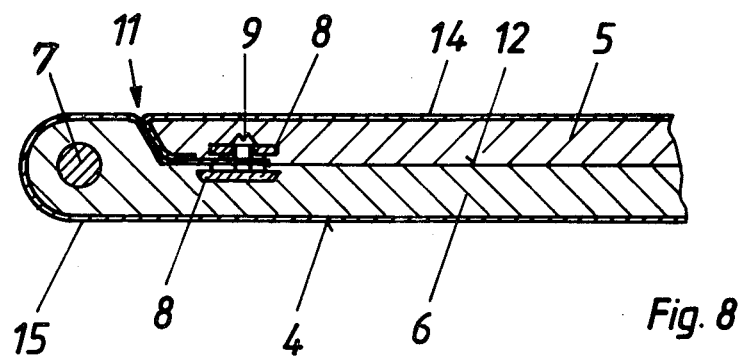
FIG. 8 is a partial section through the embodiment in FIG. 7 in the finished state.

The core of the visor embodiment shown in FIG. 11 is one-piece instead of two-piece, and it is comprised of plastic foam, for example. It has a groove 19 that runs completely around the visor body along the midline of its peripheral edge. The borders of pieces 14 and 15 are folded into the groove 19 and are secured there by pressure from the walls of the groove. For additional securement and/or for improved appearance, a finishing strip 20 can be inserted into the groove 19 and between the borders of the pieces of material to provide a smooth surface of the material all around the edges of the visor. It is also of course possible to cover only one side of this embodiment of the visor as well, using only one piece of material.

Figure 12:
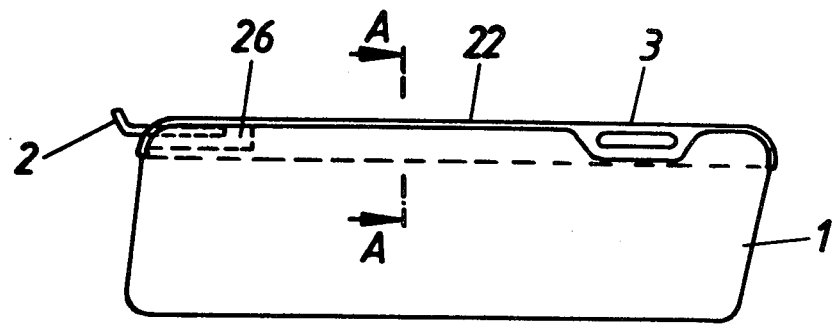
FIG. 12 is a side view of a fourth embodiment of the invention.

In the embodiment in FIG. 12, the preferably single piece core of the visor is inside a sewn-seam, bag-type of cover 4 (which had been sewn inside out and then been turned right side out). The borders of the open side of cover 4 are folded into and held under pressure in a groove 21 (FIG. 13) that is formed along one longitudinal edge of body 1. A finishing strip 22 may be introduced into groove 21 to hold the cover 4 more securely. Strip 22 is ideally of a T-section and is formed of injection-molded plastic. The top 23 of the strip 22 lies against the edge of body 1. The leg 24 of the strip 22, has longitudinal ridges along its sides to increase its holding power, and these ridges are forced into the groove 21.

When leg 24 of strip 22 is inserted into groove 21, the groove 21, which is at least slightly undercut, will expand slightly, whereby the plastic foam that the core is made out of may have to be reinforced. A U-shaped section reinforcement 25, which may be made of resilient thermoplastic resin, is therefore inserted in the core embodiment shown in FIG. 14 and surrounds the groove 21. Such a reinforcement absorbs the stress that occurs when groove 21 expands, and it will snap back to grip the borders of cover 4 and hold them against the leg 24 of strip 22.

Figures 13, 14:
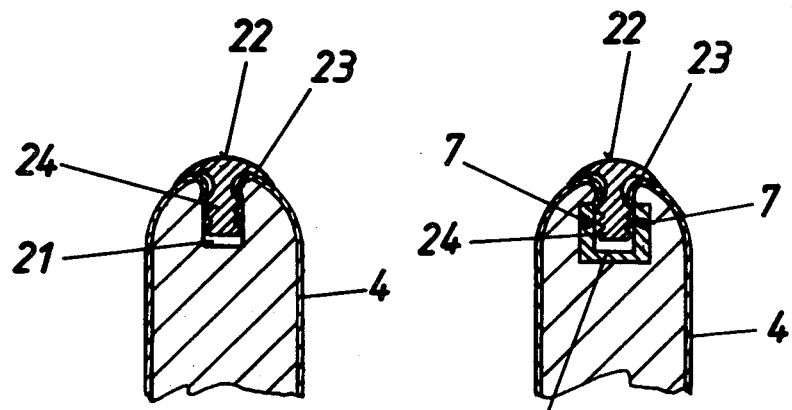
FIG. 13 is a section line A—A in FIG. 12.
FIG. 14 is another section along the same line A—A in FIG. 12, showing a different embodiment.
Figure 15:
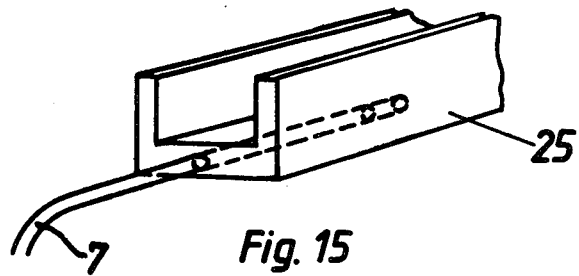
FIG. 15 is a view of a reinforcing strip of the embodiment in FIGS. 12 and 14.

It is practical for U-section reinforcement 25 to be attached to the wire frame 7 that stiffens body 1. In this case, two ends of frame 7 can be bent and inserted in corresponding bores in each side arm of U-section reinforcement 25, as shown in FIG. 14. It is also of course possible to anchor only one end of frame 7 in the end wall of the reinforcement 25, as shown in FIG. 15. FIG. 15 also illustrates the possibility of slightly undercutting (dovetail shaping) the channel in the U-section reinforcement 25 to improve its grip on the leg 24 of finishing strip 22.

The function of finishing strip 22 need not be confined to holding the borders of pieces 14 and 15 in groove 21. It may also incorporate the securing peg 3 and also ideally includes a rod-seating 26 for the support-rod 2.

The visor body 1 in the embodiment shown in FIG. 16 is comprised of two individual plates 5 and 6. One plate 5 is comprised of injection-molded plastic and the second plate 6 is comprised of plastic foam, reinforced with a wire frame 7 if necessary. Plate 5 is shell-shaped and has a inturned rim 27 around it that fits into a correspondingly shaped slit 28 in the adjacent surface of and around plate 6, for reliably holding the borders of piece 14 of the cover material at the resulting joint.

FIG. 17 shows another embodiment in which the visor body 1 is comprised of two generally shell-shaped injection-molded plates 5 and 6 with folded up or inturned peripheral edges. Plate 5 is shaped around its edge to fit into the folded up edge of plate 6 to together form a hollow core. The plates may be held together by a snap-fastener device comprising male 30 and female 29 components. A piece 14 of cover material is stretched over at least one plate 5 or 6 and the border of the material is secured between the edges of the plates. A second piece 15 of material, indicated by a dot-dash line, may also be mounted in the same way if the whole body is to be covered.

FIG. 18 shows a visor body 1 comprised of two similarly shaped plates 5 and 6 that can be fastened together by snaps 31, illustrated with dot-dash lines, with the bent up or inturned peripheral rims of the plates almost touching. A supplemental tension ring 32, which can be comprised of plastic and which fits tightly against the walls of the hollow space between the two plates, will secure the piece or pieces 14, 15 of cover material in place.

The visor body in FIG. 19 is also comprised of two generally shell-shaped plates 5 and 6 comprised of injection-molded plastic. The peripheral rims of the plates are double-walled to provide a resilient mortise-and-tenon type joint between the plates, which will hold pieces 14 and/or 15 very securely. The plates in this embodiment may also have one or more snap fasteners, not shown, like 29, 30, and 31 in FIGS. 17 and 18.

If the plates that make up the visor body 1 are made of injection-molded plastic (as described with reference to FIGS. 17 through 19), it may be practical to form the seating for support rod 2 as part of one plate or to leave an appropriately shaped depression to which such a seating can be attached later.

FIG. 20 shows still another advantage of any embodiment of the invention employing a groove or plates. A drawstring 33, preferably elastic, can be inserted through a hem around a piece of material 14 or 15 to stretch and secure the material in the area between the two plates.

All of the measures discussed above will significantly improve and facilitate covering the body of a vehicle sun visor with one or two pieces of covering material.

In the foregoing, the present invention has been described in connection with illustrative embodiments thereof. Since many variations and modifications of the present invention will now be obvious to those skilled in the art, it is preferred that the scope of this invention be determined, not by the specific disclosures herein contained, but only by the appended claims.

What is claimed is:

1. A sun visor for a vehicle comprising: a visor body having two opposite side parts joined together; each of the side parts terminating in peripheral edges around the visor body, at least one piece of material covering the visor body and extending over the peripheral edges of one of the side parts and between the abutting side parts of the visor body; clamping means within the visor body for joining the two abutting opposite side parts of the visor, the clamping means also clamping the covering material securely to the visor body.

2. The sun visor of claim 1, wherein the body opposite side parts comprises two plates connected together; each plate having opposite flat sides and the plates being assembled facewise, one side of one plate facing one side of the other plate; the piece of material covering one outwardly facing side of at least one of the plates; the border of the piece of material being folded over the peripheral edge of the respective plate and being clamped by the clamping means between the two plates.

3. The sun visor of any of claims 2, further comprising a hem around the piece of material and a drawstring through the hem for being drawn to help tighten the material in the body for effecting clamping of the material.

4. The sun visor of claim 2, wherein the exterior side of one of the plates has a depression defined in it, into which a mirror is fitted; the piece of material extending over the exterior side of the one plate and extending beneath the mirror; securing means on the plate for securing the mirror in the depression.

5. The sun visor of claim 4, wherein the securing means comprises the depression having and being defined by a sidewall and comprises a finishing strip inserted into the gap between the edge of the mirror and the adjacent sidewall of the depression.

6. The sun visor of either of claims 2, further comprising a reinforcing insert in the visor body that stiffens the body.

7. The sun visor of claim 2, wherein at the peripheries of the plates on the inwardly facing sides, a mortise and tenon type joint is provided for accepting the border of at least one piece of material when the plates are moved together to secure the joint together.

8. The sun visor of claim 2, further comprising a reinforcing insert in the body that stiffens the body, and the insert further comprises braces in each of the plates, one set of braces being for supporting the pins and one set of braces having the pin receiving holes defined therein.

9. The sun visor of claim 1 in which the clamping means comprises a plurality of pins each in a respective side and a corresponding plurality of holes in the other of the sides, wherein the pins and holes are placed and shaped to be snapped together.

10. The sun visor of claim 9, wherein each pin has a shaft and has a head at the end of the shaft, which head is thicker than the shaft.

11. The sun visor of claim 2, wherein the plates are congruent.

12. The sun visor of claim 2, wherein the first of the plates is shorter and narrower in dimension than the second of the plates, and the second plate has a longitudinal recess in the inwardly facing side thereof which is shaped to the dimensions of the first plate and in which the first plate is snugly received.

13. The sun visor of claim 11, wherein the depression is so placed that the second plate has a peripheral generally unrecessed margin around the longitudinal recess.

14. The sun visor of claim 11, wherein the plates are comprised of foam material.

15. The sun visor of claim 11, wherein one of the plates is comprised of foam material and the other of the plates is comprised of injection molded plastic material.

16. The sun visor of claim 11, wherein the plates are comprised of injection molded plastic material.

17. The sun visor of claim 11, further comprising a reinforcing insert in the body that stiffens the body.

18. The sun visor of claim 2, wherein the plates are comprised of foam material.

19. The sun visor of claim 1, further comprising a reinforcing insert in the body that stiffens the body.

20. The sun visor of claim 18, further comprising a hem around the piece of material and a drawstring through the hem for being drawn to help tighten the material in the body for effecting clamping of the material.

21. The sun visor of claim 17, further comprising a reinforcing insert between the plates and the reinforcing insert comprising a wire frame.

22. The sun visor of either of claims 2, wherein one of the plates is comprised of foam material and the other of the plates is comprised of injection molded plastic material.

23. The sun visor of either of claims 2, wherein the plates are comprised of injection molded plastic material.

24. The sun visor of claim 23, wherein at the peripheries of the plates on the inwardly facing sides, a mortise and tenon type joint is provided for accepting the border of at least one piece of material when the plates are moved together to secure the joint together.

25. The sun visor of claim 23, wherein the plates each have inturned borders to together define an enclosed hollow space between the plates.

26. The sun visor of claim 25, wherein at the peripheries of the plates on the inwardly facing sides, a mortise and tenon type joint is provided for accepting the border of at least one piece of material when the plates are moved together to secure the joint together.

27. The sun visor of claim 25, further comprising a tension ring that fits tightly against the interior sides of the plates at the inturned borders and between the two plates to secure there the piece of cover material.

* * * * *